United States Patent
Asa

(10) Patent No.: US 12,043,104 B2
(45) Date of Patent: Jul. 23, 2024

(54) VEHICLE

(71) Applicants: TOYOTA JIDOSHA KABUSHIKI KAISHA, Toyota (JP); SUBARU CORPORATION, Tokyo (JP)

(72) Inventor: Ryosuke Asa, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 351 days.

(21) Appl. No.: 17/675,583

(22) Filed: Feb. 18, 2022

(65) Prior Publication Data

US 2022/0305897 A1 Sep. 29, 2022

(30) Foreign Application Priority Data

Mar. 26, 2021 (JP) .................................. 2021-053689

(51) Int. Cl.
*B60R 13/04* (2006.01)
*B60K 1/04* (2019.01)
*B60L 50/64* (2019.01)
*B60R 16/04* (2006.01)

(52) U.S. Cl.
CPC ................ *B60K 1/04* (2013.01); *B60L 50/64* (2019.02); *B60R 13/04* (2013.01); *B60R 16/04* (2013.01); *B60K 2001/0438* (2013.01); *B60K 2001/0472* (2013.01); *B60Y 2306/01* (2013.01)

(58) Field of Classification Search
CPC .... B60R 13/04; B60K 1/04; B60K 2001/0438
USPC .................................... 296/209, 1.08; 428/31
See application file for complete search history.

(56) References Cited

U.S. PATENT DOCUMENTS

| | | | |
|---|---|---|---|
| 7,354,102 B2 * | 4/2008 | Cave ................... | B60R 13/0206 296/1.08 |
| 7,464,986 B2 * | 12/2008 | Maki ................... | B29C 45/0081 296/209 |
| 8,083,285 B2 * | 12/2011 | Yanagida ........... | B62D 25/2036 296/29 |
| 8,262,154 B2 * | 9/2012 | Garnett ..................... | B60J 5/04 296/199 |
| 11,760,278 B2 * | 9/2023 | Hihara .................... | B60R 13/04 296/193.05 |
| 2011/0127797 A1 * | 6/2011 | Garnett ............... | B62D 25/025 296/204 |

(Continued)

FOREIGN PATENT DOCUMENTS

| | | |
|---|---|---|
| JP | 07-246844 A | 9/1995 |
| JP | 2010-083477 A | 4/2010 |

(Continued)

*Primary Examiner* — Dennis H Pedder
(74) *Attorney, Agent, or Firm* — Dinsmore & Shohl LLP

(57) ABSTRACT

A vehicle includes a body including a rocker extending in a front and rear direction outside a floor panel in a vehicle width direction, a component located below the floor panel and removably mounted on the body from below, and a rocker molding extending from a location facing an outer side of the rocker in the vehicle width direction to a location facing a lower side of the component. The rocker molding has a side panel facing the outer side of the rocker and a lower panel facing the lower side of the component. The side panel is fixed to the body. The lower panel is removably fixed to the component and swingably connected to the side panel.

13 Claims, 5 Drawing Sheets

(56) References Cited

U.S. PATENT DOCUMENTS

2018/0126933 A1     5/2018  Takayanagi et al.
2019/0382051 A1*   12/2019  Toyota .................. B62D 25/02

FOREIGN PATENT DOCUMENTS

| JP | 2012-171611 A | 9/2012 |
| JP | 2013-035393 A | 2/2013 |
| JP | 2018-075939 A | 5/2018 |
| JP | 2019-214314 A | 12/2019 |

* cited by examiner

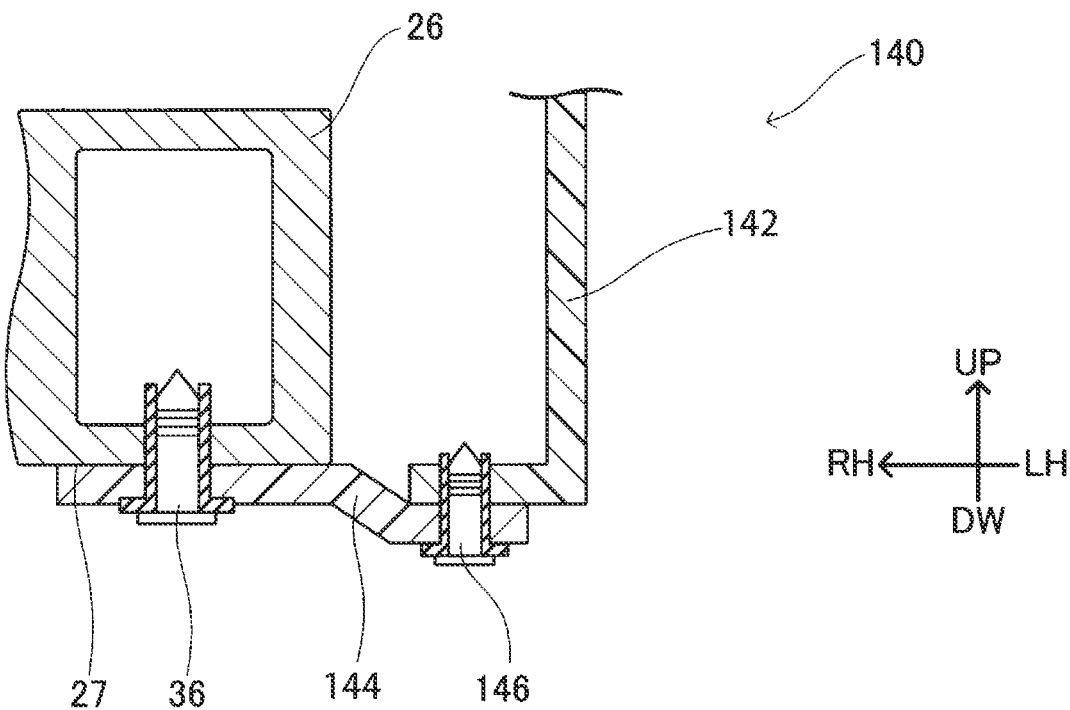
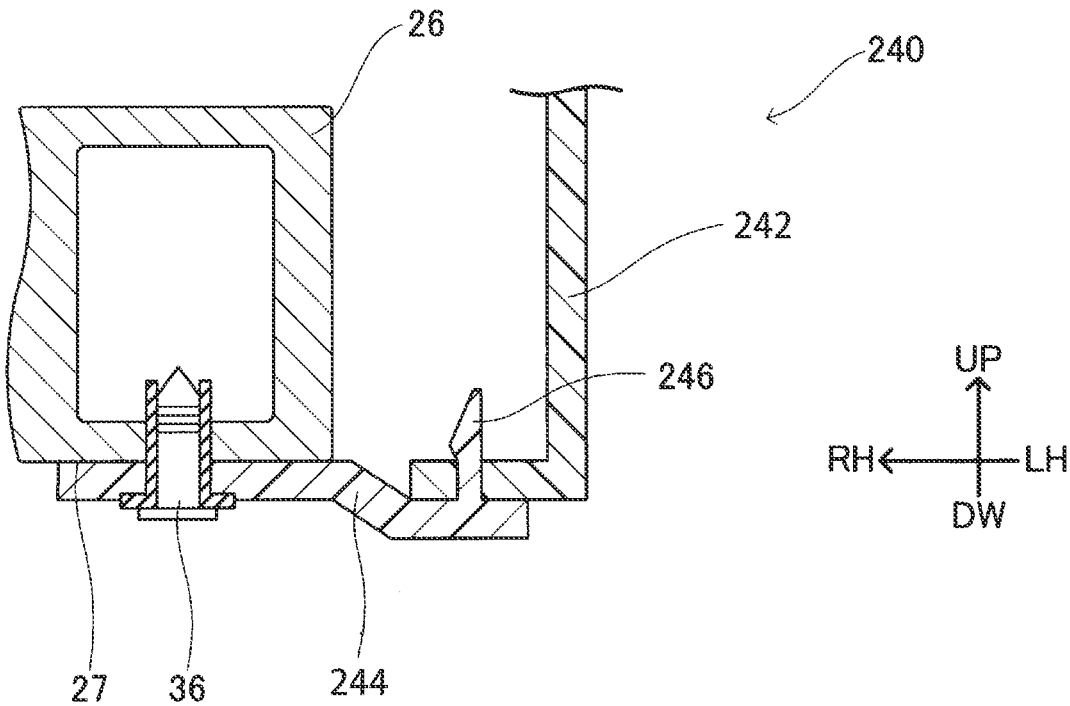

VEHICLE

CROSS-REFERENCE TO RELATED APPLICATION

This application claims priority to Japanese Patent Application No. 2021-053689 filed on Mar. 26, 2021, incorporated herein by reference in its entirety.

BACKGROUND

1. Technical Field

A technology disclosed in the specification relates to a vehicle.

2. Description of Related Art

Japanese Unexamined Patent Application Publication No. 2018-075939 (JP 2018-075939 A) describes a vehicle. The vehicle is an electrified vehicle. The vehicle includes a body and a battery unit mounted on the body. The body includes a floor panel and a pair of rockers. Each of the rockers extends in a front and rear direction outside a floor panel in a vehicle width direction. The battery unit is located below the floor panel and is mounted on the body so as to be removable from below.

SUMMARY

In a vehicle, various exterior panels are provided to improve its appearance. A rocker molding is known as one of such exterior panels. A rocker molding is mainly an exterior panel for covering a rocker and is typically provided so as to face the outer side and lower side of the rocker. Various names other than rocker molding are known, and the rocker molding is also called a rocker trim panel, a side sill molding, or a side sill trim panel.

As described above, for example, in an electrified vehicle, a component, such as a battery unit, is placed below a floor panel. In such a vehicle, it is conceivable to extend a rocker molding to the lower side of the component to cover the component with the rocker molding. However, when the rocker molding is extended to the lower side of the component, the presence of the rocker molding is inconvenient when the component needs to be removed from the body for the purpose of, for example, replacement or maintenance of the component. In other words, when the component is removed from the body, the rocker molding also needs to be removed from the body.

The specification provides a technology for implementing a rocker molding suitable for the structure of a vehicle in which a battery unit or another component is placed below a floor panel.

A technology disclosed in the specification relates to a vehicle. The vehicle includes a body including a rocker extending in a front and rear direction outside a floor panel in a vehicle width direction, a component located below the floor panel and removably mounted on the body from below, and a rocker molding extending from a location facing an outer side of the rocker in the vehicle width direction to a location facing a lower side of the component. The rocker molding has a side panel facing the outer side of the rocker and a lower panel facing the lower side of the component. The side panel is fixed to the body. The lower panel is removably fixed to the component and swingably connected to the side panel.

In the vehicle, the rocker molding includes the side panel and the lower panel. The side panel faces the outer side of the rocker. The lower panel faces the lower side of the component. Thus, the rocker molding is able to cover not only the rocker but also the component. In addition, the lower panel is removably fixed to the component and swingably connected to the side panel. With such a configuration, by releasing the fixation of the lower panel to the component, the lower panel is able to be swung outward in the width direction. Thus, a worker is able to remove the component from the body by retracting the lower panel from below the component without removing the rocker molding from the vehicle. Then, the worker is able to mount, for example, the component after maintenance to the body again.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a cross-sectional view showing a rocker molding according to a first reference example; and FIG. 7 is a cross-sectional view showing a rocker molding according to a second reference example.

DETAILED DESCRIPTION OF EMBODIMENTS

Figure 1:
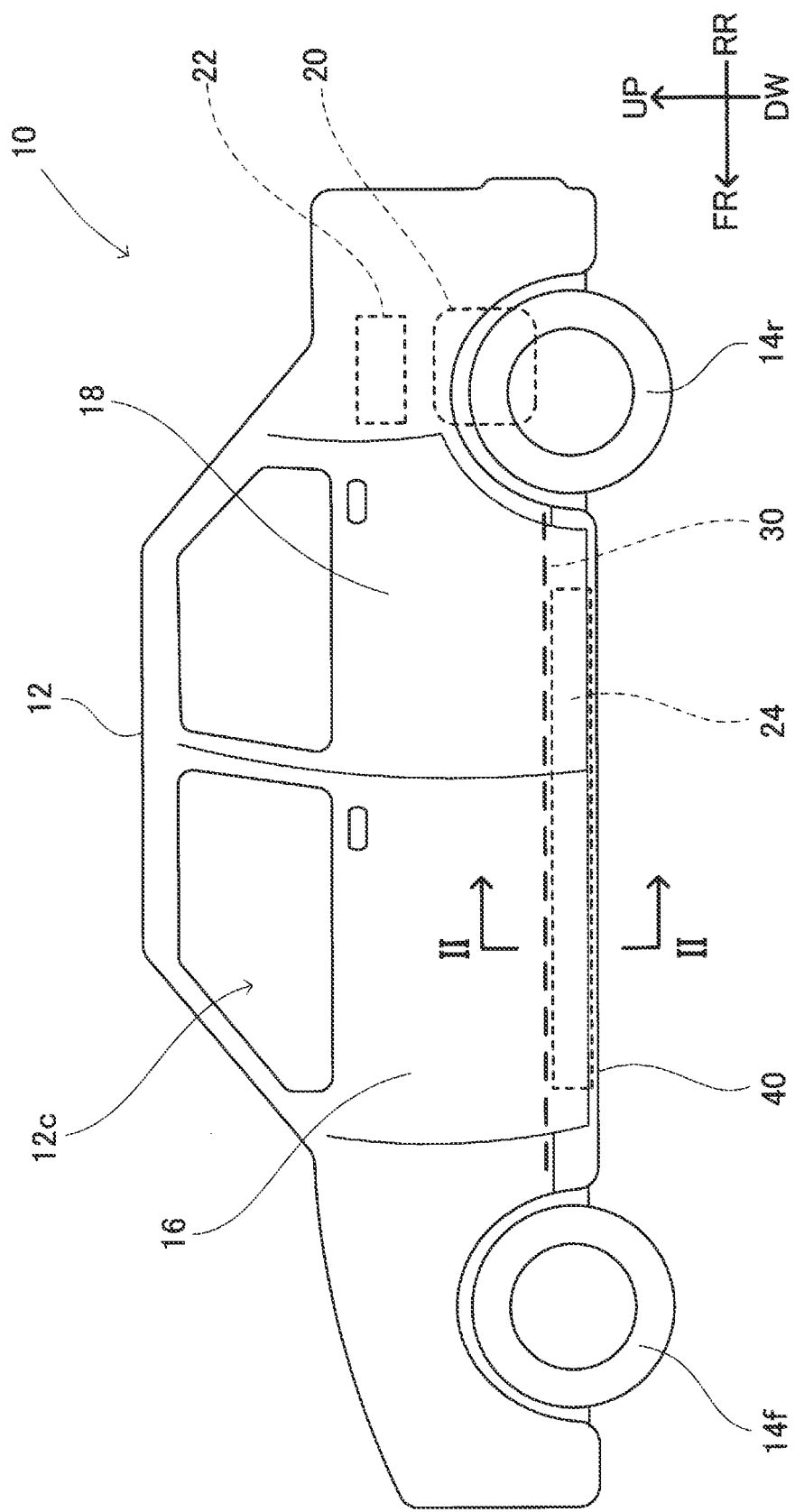
FIG. 1 is a view schematically showing a vehicle according to an embodiment.

In an embodiment of the technology, the rocker molding may further include an engagement structure that, when the lower panel is swung to a predetermined retracted position, engages the lower panel with the side panel. With such a configuration, when the lower panel is swung to the retracted position, the position of the lower panel is maintained by the engagement structure. Therefore, it is easy for a worker to mount the component to the body and remove the component from the body.

In the above embodiment, when the lower panel is placed in the predetermined retracted position, the lower panel may be located outside the side panel in the vehicle width direction. With such a configuration, the lower panel is able to be sufficiently retracted from the component. Therefore, it is easy for a worker to mount the component to the body and remove the component from the body.

In the above embodiment, the engagement structure may include at least one first engagement surface provided in one of the lower panel and the side panel, and at least one second engagement surface provided in the other one of the lower panel and the side panel. In this case, when the lower panel is swung to the predetermined retracted position, the at least one first engagement surface and the at least one second engagement surface may be configured to be engaged with each other. With such a configuration, the engagement structure with a relatively simple configuration can be configured integrally with the lower panel and the side panel, so it is possible to avoid a complex structure of the rocker molding. Here, the engagement does not always need a geometrical fit and includes limitations on a relative displacement between two components due to, for example, frictional force.

In the above embodiment, one of the lower panel and the side panel may have at least one projecting portion in each of which the first engagement surface is provided. In this case, the other one of the lower panel and the side panel may have at least one recess in each of which the second engagement surface is provided. When the lower panel is swung to the predetermined retracted position, the at least one projecting portion may be configured to be respectively inserted into the at least one recess. With such a configuration, reliable engagement between the first engagement surface and the second engagement surface and smooth release of the engagement can be achieved by elastic deformation caused by the projecting portion. Here, the recess is, for example, a hole or a cutout. The hole may be a closed-end hole or may be a through-hole. The projecting portion may have a shape called hook, holder, or lug in mechanical terms.

In an embodiment of the technology, the vehicle may further include a side door located above the rocker and mounted to the body so as to be openable and closable. The lower panel may be located below the side door even when placed in the predetermined retracted position. With such a configuration, even when the lower panel of the rocker molding is maintained in the retracted position, for example, a worker is able to open and close the side door where necessary.

In an embodiment of the technology, the side panel and the lower panel may be made up of a single member. In this case, the side panel and the lower panel may be connected via an integral hinge. With such a configuration, the rocker molding according to the technology can be implemented with a simple configuration.

In an embodiment of the technology, the lower panel may be divided into at least a front part and a rear part in the front and rear direction. In this case, the front part and rear part of the lower panel may be independently swingable with respect to the side panel. When the lower panel is divided into multiple pieces, work for swinging the lower panel is easy. In addition, force that acts on each connecting portion between the side panel and the lower panel is reduced.

In an embodiment of the technology, the vehicle may further include a drive motor. In this case, the component may include a battery unit configured to supply electric power to the drive motor. In a vehicle of this type (so-called electrified vehicle), a large-size battery unit is required, components including a battery unit are located close to a rocker or mounted to the rocker. With the thus configured vehicle, the technology disclosed in the specification is able to sufficiently exercise the advantageous effects.

In the above embodiment, the component may include an energy absorbing member located outside the battery unit in a right and left direction of the battery unit. In this case, the lower panel may be placed along a lower side of the energy absorbing member and removably fixed to the lower side of the energy absorbing member. Here, the energy absorbing member means a member designed so as to absorb collision energy by plastically deforming by a larger amount than the battery unit when a collision load is added to the vehicle. A specific configuration of the energy absorbing member is not limited. For example, the energy absorbing member may be a hollow member made of, for example, a metal, such as aluminum, and may have one or a plurality of cavities extending in the vehicle front and rear direction.

In the specification, it is assumed that simple terms front side, rear side, and front and rear direction respectively mean front side, rear side, and front and rear direction in a vehicle. Similarly, simple terms right-hand side, left-hand side, and right and left direction respectively mean right-hand side, left-hand side, and right and left direction in a vehicle, and simple terms upside, downside, and up and down direction respectively mean upside, downside, and up and down direction in a vehicle. For example, when a vehicle is placed on a horizontal plane, the up and down direction of the vehicle coincides with a vertical direction. The right and left direction of the vehicle is a direction parallel to the horizontal plane and axles of the vehicle. The front and rear direction of the vehicle is a direction parallel to the horizontal plane and perpendicular to the axles of the vehicle. The right and left direction in the vehicle may be expressed as vehicle width direction (or simply width direction).

A vehicle 10 according to an embodiment will be described with reference to the accompanying drawings. The vehicle 10 is a so-called automobile and is a vehicle that runs on a road. In the drawing, the direction FR indicates a front side in the front and rear direction of the vehicle 10, and the direction RR indicates a rear side in the front and rear direction of the vehicle 10. The direction LH indicates a left-hand side in the right and left direction (or width direction) of the vehicle 10. The direction RH indicates a right-hand side in the right and left direction of the vehicle 10. The direction UP indicates an upside in the up and down direction of the vehicle 10. The direction DW indicates a downside in the up and down direction of the vehicle 10. In the specification, the front and rear direction of the vehicle 10, the right and left direction of the vehicle 10, and the up and down direction of the vehicle 10 may be respectively simply referred to as front and rear direction, right and left direction, and up and down direction.

As shown FIG. 1, the vehicle 10 includes a body 12, a plurality of side doors 16, 18, and a plurality of wheels 14f, 14r. The body 12 is not limited and is mainly made of a metal. A cabin 12c is provided inside the body 12. The cabin 12c is configured to be capable of accommodating one or a plurality of users. A floor panel 30 of the body 12 expands under the cabin 12c. As another embodiment, the vehicle 10 may be an unmanned vehicle with no cabin 12c. In this case, the vehicle 10 may include a luggage room on the floor panel 30, instead of the cabin 12c.

The side doors 16, 18 are on the side of the body 12 and mounted to the body 12 so as to be openable and closable. A user is able to get into or get out of the cabin 12c by opening the side door 16 or the side door 18. Although not limited, the side doors 16, 18 include a front side door 16, and a rear side door 18 located on the rear side of the front side door 16. The two side doors 16, 18 are not only provided on the left-hand side of the body 12, shown in FIG. 1, but also provided on the right-hand side of the body 12. The side doors 16, 18 in the present embodiment are hinged doors that swing along a horizontal direction. However, in another embodiment, the side doors 16, 18 may be, for example, doors of other types, such as slide doors, gull-wing doors, and butterfly doors.

Each of the wheels 14f, 14r is rotatably supported by the body 12. The wheels 14f, 14r include a pair of the front wheels 14f located at the front of the body 12 and a pair of the rear wheels 14r located at the rear of the body 12. The front wheels 14f are disposed coaxially with each other. The rear wheels 14r are also disposed coaxially with each other. The front wheels 14f are steered wheels that change the orientations of their rotation axes in response to operation of a user. The rear wheels 14r are drive wheels as will be described below. The number of the wheels 14f, 14r is not limited to four.

The vehicle 10 further includes a motor 20, a power control unit 22, and a battery unit 24. The motor 20 is a drive motor that drives the rear wheels 14r. The motor 20 is mechanically connected to the rear wheels 14r. The battery unit 24 is a power supply that supplies electric power to the motor 20. The battery unit 24 is electrically connected to the motor 20 via the power control unit 22. The battery unit 24 incorporates a plurality of secondary battery cells. The battery unit 24 is configured to be rechargeable with external electric power or electric power regenerated by the motor 20. The battery unit 24 is located below the floor panel 30 and is disposed along the floor panel 30. The power control unit 22 incorporates a DC-DC converter and/or an inverter. The power control unit 22 controls driving electric power to be supplied from the battery unit 24 to the motor 20 or regenerative electric power to be supplied from the motor 20 to the battery unit 24 in response to, for example, driving operation of a user.

The motor 20 is not limited to driving the rear wheels 14r. The motor 20 may be configured to drive at least one of the wheels 14f, 14r. For example, the vehicle 10 may further include another driving source, such as an engine, instead of or in addition to the motor 20. The vehicle 10 may include another power supply, such as a fuel cell unit and a solar cell panel, in addition to or instead of the battery unit 24. The vehicle 10 is not limited to a battery electric vehicle described here and may be a hybrid electric vehicle, a fuel cell electric vehicle, a solar car, or the like. The vehicle 10 according to the present embodiment is not limited to a vehicle that is driven by a user, and also includes a vehicle that is operated by an external device and a vehicle that autonomously runs.

Figure 2:
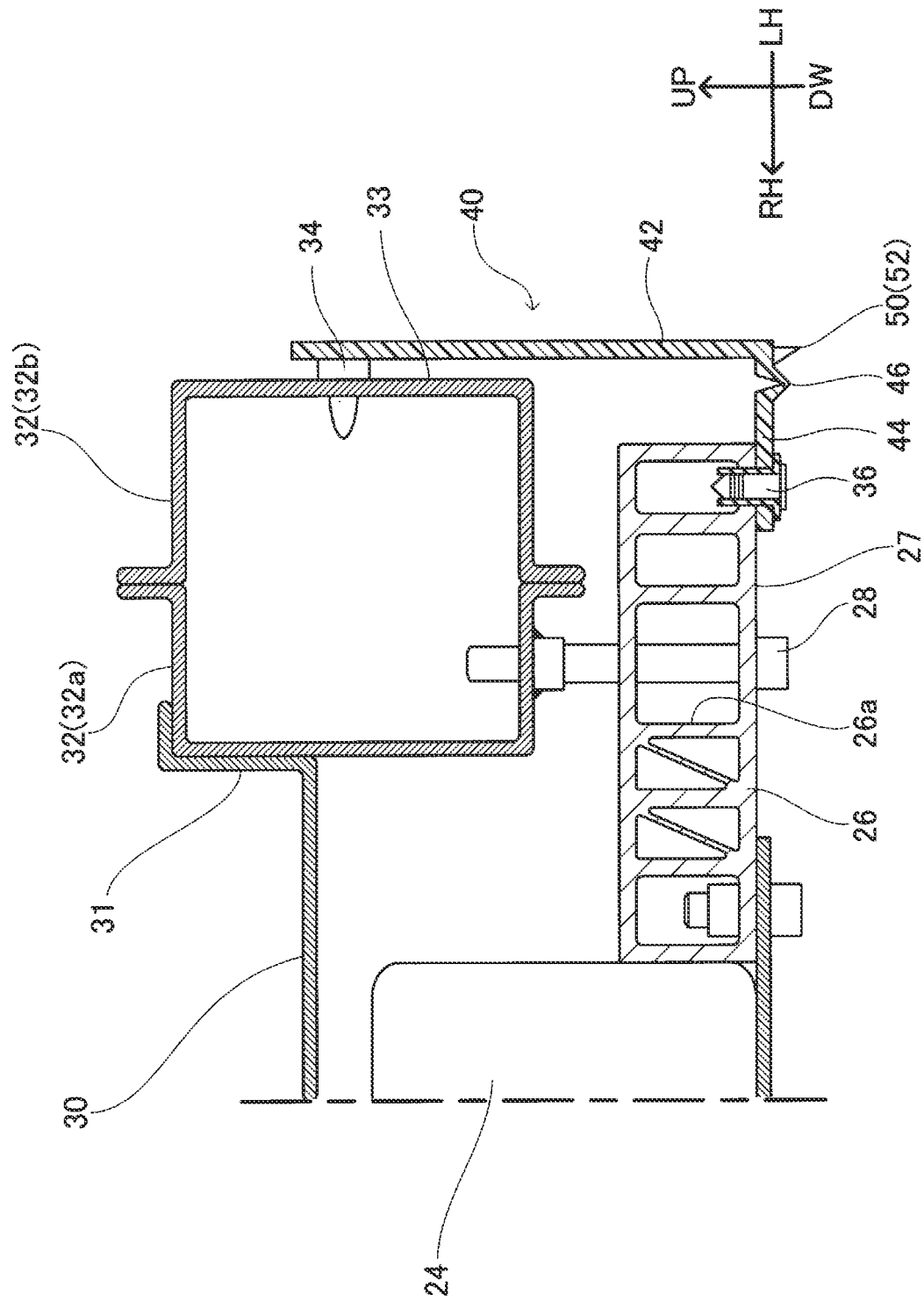
FIG. 2 is a cross-sectional view taken along the line II-II in FIG. 1.

As shown in FIG. 2, the body 12 includes the floor panel 30 and a pair of rockers 32. The floor panel 30 is a sheet member that makes up the bottom surface of the cabin 12c. The rockers 32 are beam members that make up part of the frame in the body 12. The rockers 32 are located at both side edges 31 of the floor panel 30. The rockers 32 extend in the front and rear direction outside the floor panel 30 in the width direction. The rockers 32 are provided symmetrically to each other in the width direction of the vehicle 10. For this reason, FIG. 2 shows only the rocker 32 provided at the left-side part of the vehicle 10 and does not show the other rocker 32.

Although not limited, the rocker 32 in the present embodiment includes a rocker inner panel 32a located on the inner side in the width direction and a rocker outer panel 32b located on the outer side in the width direction. The rocker inner panel 32a and the rocker outer panel 32b are joined with each other at their upper edges and lower edges. The rocker 32 defines inside a closed space extending in the front and rear direction. The floor panel 30 is provided over between the rockers 32 and is joined with the rocker inner panels 32a at both side edges 31, respectively. The rocker 32 is not limited to the set of rocker inner panel 32a and rocker outer panel 32b. The rocker 32 may be made up of three or more panels.

As described above, the battery unit 24 is mounted below the floor panel 30. The battery unit 24 is mounted on the body 12 so as to be removable from below. For example, the battery unit 24 in the present embodiment is fixed to each of the rockers 32 via an energy absorbing member 26. The energy absorbing member 26 is provided on each side of the battery unit 24 in the width direction and is fixed to the battery unit 24. The energy absorbing member 26 absorbs collision energy by plastically deforming by a larger amount than the battery unit 24 when a collision load is added to the body 12 as a result of, for example, a side collision of the vehicle 10.

The energy absorbing member 26 is, for example, a hollow member made of a metal, such as aluminum, and has a plurality of cavities 26a extending in the front and rear direction. The energy absorbing member 26 is fixed to each of the rockers 32 by using a fastening member 28, such as bolt and nut. Thus, the battery unit 24 is removable from the body 12 together with the energy absorbing members 26 by removing the fastening members 28. Here, the battery unit 24 and the energy absorbing member 26 in the present embodiment are examples of the component in the technology disclosed in the specification. A specific configuration of the energy absorbing member 26 is not limited. The energy absorbing member 26 is not always needed.

Figure 3:
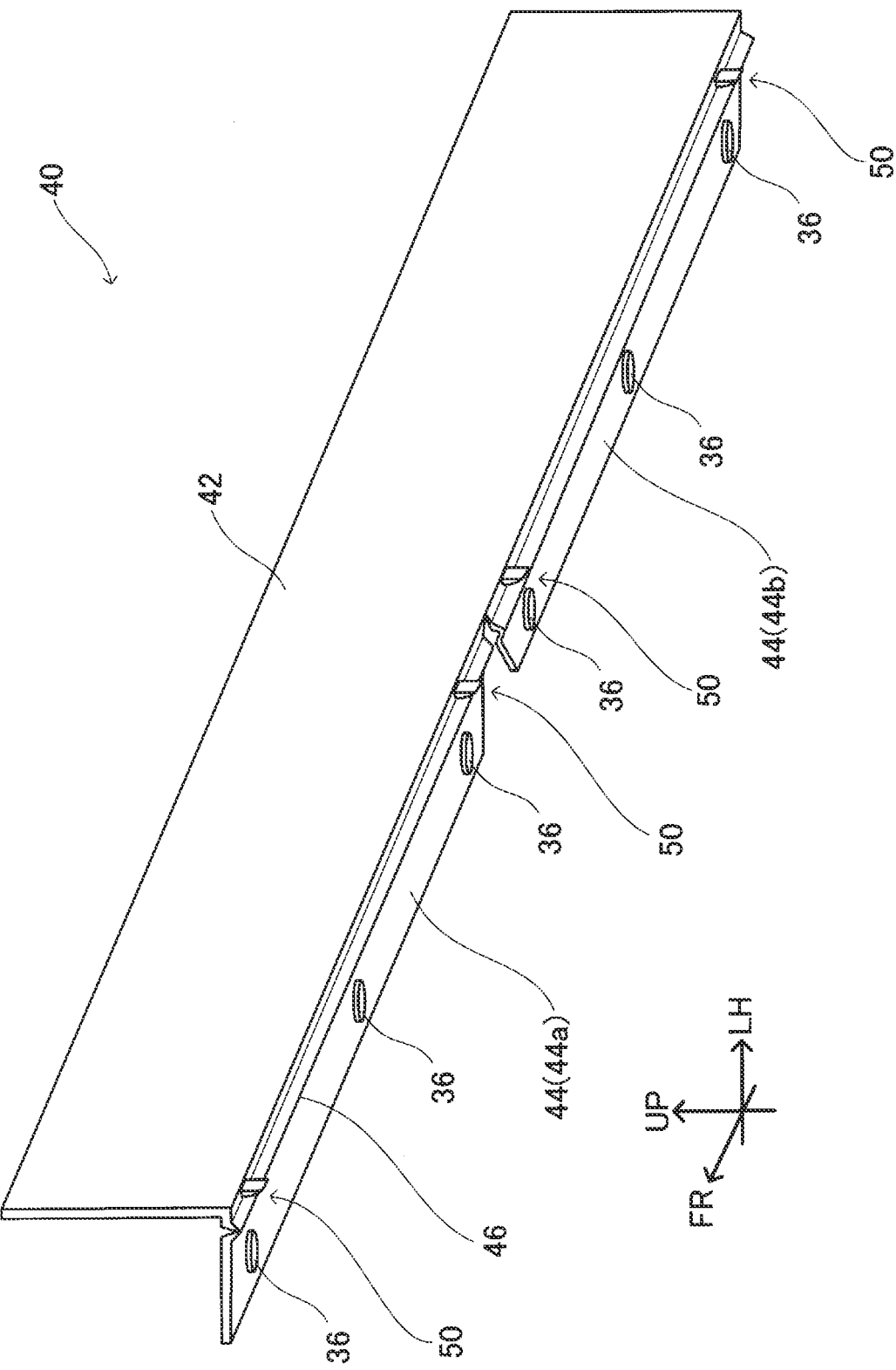
FIG. 3 is a view showing a rocker molding.

As shown in FIG. 2 and FIG. 3, the vehicle 10 further includes a pair of rocker moldings 40. Each of the rocker moldings 40 is one of exterior panels provided in the vehicle 10 for the purpose of improving the appearance of the vehicle 10. The rockers 32 are provided symmetrically to each other in the width direction of the vehicle 10. For this reason, FIG. 2 and FIG. 3 show only the rocker molding 40 provided at the left-side part of the vehicle 10 and do not show the other rocker molding 40. Hereinafter, the rocker molding 40 provided at the left-side part of the vehicle 10 will be mainly described, and the description thereof also applies to the rocker molding 40 provided at the right-side part of the vehicle 10.

The rocker molding 40 extends from a location facing an outer side 33 of the rocker 32 to a location facing a lower side 27 of the energy absorbing member 26. Although not limited, the rocker molding 40 is made of, for example, a high-polymer material, such as a resin material. The rocker molding 40 is, for example, called a rocker trim panel, a side sill molding, a side sill trim panel, or the like. Here, the outer side 33 of the rocker 32 means a range located outside in the width direction out of the sides of the rocker 32 extending in the front and rear direction.

The rocker molding 40 includes a side panel 42, a lower panel 44, and a hinge 46. The side panel 42 is provided along the outer side 33 of the rocker 32. The side panel 42 faces the outer side 33. The side panel 42 extends downward from the location facing the outer side 33 of the rocker 32. A lower part of the side panel 42 faces the energy absorbing member 26 from outside in the width direction. The side panel 42 is fixed to the rocker 32 by using a plurality of fasteners 34.

The lower panel 44 is provided along the lower side 27 of the energy absorbing member 26 and faces the lower side 27. The lower panel 44 extends outward in the width direction from the location facing the lower side 27 of the energy absorbing member 26 and is connected to the side panel 42 via the hinge 46. The lower panel 44 is fixed to the energy absorbing member 26 by using a plurality of fasteners 36. The fasteners 36 fix the lower panel 44 to the energy absorbing member 26 such that the lower panel 44 is removable from the energy absorbing member 26. The hinge 46 connects the side panel 42 and the lower panel 44 such that the side panel 42 and the lower panel 44 are swingable with respect to each other. The hinge 46 extends along the front and rear direction. The central axis of swing by the hinge 46 is parallel to the front and rear direction. For example, the hinge 46 in the present embodiment is an integral hinge, and the side panel 42 and the lower panel 44 are made up of a single member. However, a specific configuration of the hinge 46 is not limited. As another embodiment, the hinge 46 may be configured to connect the side panel 42 and the lower panel 44 respectively made up of individual members such that the side panel 42 and the lower panel 44 are swingable with respect to each other.

Figure 4:
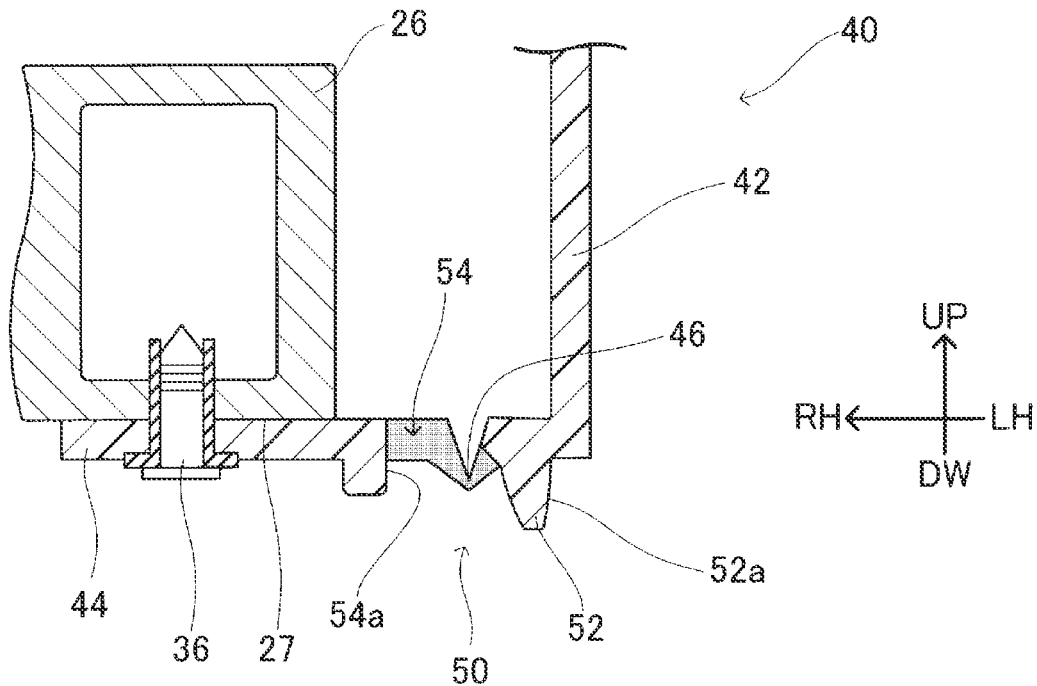
FIG. 4 is a cross-sectional view showing the rocker molding, in which a lower panel is fixed to an energy absorbing member.
Figure 5:
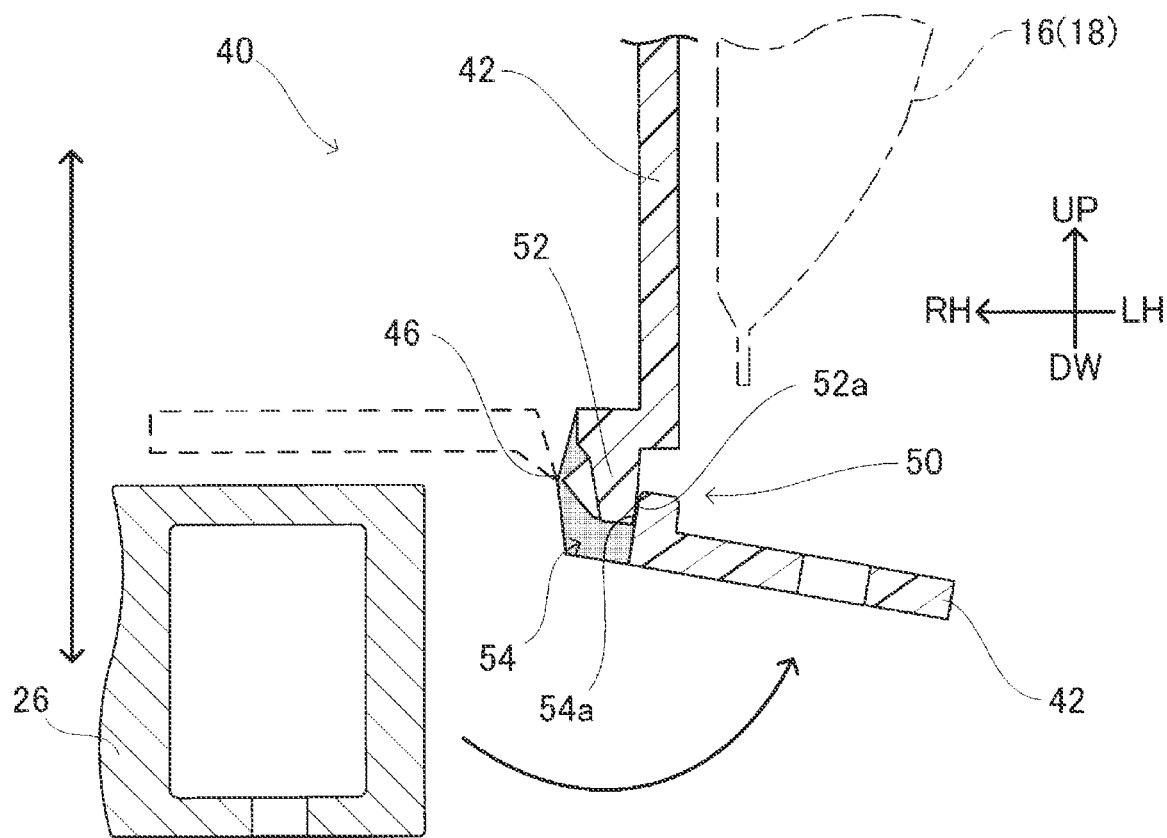
FIG. 5 is a cross-sectional view showing the rocker molding, in which the lower panel is moved to a predetermined retracted position.

With the above configuration, as shown in FIG. 4 and FIG. 5, when the fixation with the fasteners 36 is released, the lower panel 44 is able to swing in the right and left direction with respect to the side panel 42. Thus, a worker is able to remove the battery unit 24 from the body 12 by retracting the lower panel 44 from below the energy absorbing member 26 without removing the rocker molding 40 from the vehicle 10. Here, the lower panel 44 in the present embodiment is divided into a front part 44*a* and a rear part 44*b* in the front and rear direction. The front part 44*a* and the rear part 44*b* are able to swing independently of each other. When the lower panel 44 is divided into multiple pieces, work for swinging the lower panel 44 is easy, and force that acts on the hinge 46 can be reduced.

In the vehicle 10 according to the present embodiment, the rocker molding 40 further includes an engagement structure 50. The engagement structure 50 engages the lower panel 44 with the side panel 42 when the lower panel 44 is swung to a predetermined retracted position (see FIG. 5). With such a configuration, when the lower panel 44 is swung to the retracted position, the position of the lower panel 44 is maintained by the engagement structure 50. Thus, it is easy for a worker to mount the battery unit 24 to the body 12 and remove the battery unit 24 from the body 12. Particularly, the lower panel 44 is located outside the side panel 42 in the width direction when the lower panel 44 is in the predetermined retracted position. With such a configuration, the lower panel 44 is able to be sufficiently retracted from the energy absorbing member 26.

A specific configuration of the engagement structure 50 is not limited. For example, the rocker molding 40 in the present embodiment includes a plurality of projecting portions 52 provided in the side panel 42 and a plurality of recesses 54 provided in the lower panel 44, as the engagement structure 50. Each of the projecting portions 52 has a first engagement surface 52*a*. Each of the recesses 54 has a second engagement surface 54*a*. When the lower panel 44 is swung to the predetermined retracted position, the projecting portions 52 of the side panel 42 are respectively inserted in the recesses 54 of the lower panel 44. Thus, the first engagement surfaces 52*a* provided in the side panel 42 and the second engagement surfaces 54*a* provided in the lower panel 44 are engaged with each other, and the lower panel 44 is fixed in the predetermined retracted position. With such a configuration, the engagement structure 50 with a relatively simple configuration can be configured integrally with the side panel 42 and the lower panel 44.

Although not limited, the projecting portions 52 of the side panel 42 have a shape called hook, holder, or lug in mechanical terms and are configured to be elastically deformable. On the other hand, the recesses 54 of the lower panel 44 are holes extending through the lower panel 44. However, the recesses 54 may be closed-end holes or may be cutouts. As another embodiment, one or some or all of the projecting portions 52 may be provided in the lower panel 44, and one or some or all of the recesses 54 may be provided in the side panel 42.

As shown in FIG. 5, the lower panel 44 of the rocker molding 40 may be located below the side doors 16, 18 when the lower panel 44 is in the predetermined retracted position. With such a configuration, even when the lower panel 44 of the rocker molding 40 is maintained in the retracted position, a worker is able to open and close the side doors 16, 18 where necessary.

A rocker molding 140 according to a first reference example will be described with reference to FIG. 6. The rocker molding 140 according to the first reference example, as well as the rocker molding 40 according to the embodiment, includes the side panel 142 and the lower panel 144. However, the rocker molding 140 according to the first reference example includes no hinge 46, and the side panel 142 and the lower panel 144 are respectively made up of members independent of each other. The side panel 142 and the lower panel 144 are removably connected by using fasteners 146. With such a configuration as well, a worker is able to remove the battery unit 24 from the body 12 by retracting the lower panel 144 from below the energy absorbing member 26 without removing the rocker molding 140 from the vehicle 10.

A rocker molding 240 according to a second reference example will be described with reference to FIG. 7. In the rocker molding 240 according to the second reference example, as well as the rocker molding 140 according to the first reference example, the side panel 242 and the lower panel 244 are respectively made up of members independent of each other. However, the side panel 242 and the lower panel 244 are removably connected by a fitting structure 246. The fitting structure 246 is formed integrally with the side panel 242 and the lower panel 244 by combining, for example, projecting portions and recesses. With such a configuration as well, a worker is able to remove the battery unit 24 from the body 12 by retracting the lower panel 244 from below the energy absorbing member 26 without removing the rocker molding 240 from the vehicle 10.

The embodiments of the technology are described in detail above; however, these are only illustrative and are not intended to limit the appended claims. The technology described in the appended claims also encompasses various modifications and changes from the specific examples illustrated above. The technical elements described in the specification or the drawings exhibit technical usability solely or in various combinations and are not limited to combinations of the appended claims at the time of filing the application. The technology illustrated in the specification and drawings can achieve multiple purposes at the same time and has technical usability by achieving one of those purposes.

What is claimed is:

1. A vehicle comprising:
   a body including a rocker extending in a front and rear direction outside a floor panel in a vehicle width direction;
   a component located below the floor panel and mounted on the body so as to be removable from below; and
   a rocker molding extending from a location facing an outer side of the rocker in the vehicle width direction to a location facing a lower side of the component, wherein:
   the rocker molding has a side panel facing the outer side of the rocker and a lower panel facing the lower side of the component;
   the side panel is fixed to the body; and
   the lower panel is removably fixed to the component and swingably connected to the side panel.

2. The vehicle according to claim 1, wherein the rocker molding further includes an engagement structure that, when the lower panel is swung to a predetermined retracted position, engages the lower panel with the side panel.

3. The vehicle according to claim 2, wherein, when the lower panel is placed in the predetermined retracted position, the lower panel is located outside the side panel in the vehicle width direction.

4. The vehicle according to claim 2, wherein:
the engagement structure includes
at least one first engagement surface provided in one of the lower panel and the side panel, and
at least one second engagement surface provided in the other one of the lower panel and the side panel; and
when the lower panel is swung to the predetermined retracted position, the at least one first engagement surface and the at least one second engagement surface are engaged with each other.

5. The vehicle according to claim 4, wherein:
one of the lower panel and the side panel has at least one projecting portion in each of which the first engagement surface is provided;
the other one of the lower panel and the side panel has at least one recess in each of which the second engagement surface is provided; and
when the lower panel is swung to the predetermined retracted position, the at least one projecting portion is respectively inserted into the at least one recess.

6. The vehicle according to claim 2, further comprising a side door located above the rocker and mounted to the body so as to be openable and closable, wherein the lower panel is located below the side door even when placed in the predetermined retracted position.

7. The vehicle according to claim 1, wherein:
the side panel and the lower panel are made up of a single member; and
the side panel and the lower panel are connected via an integral hinge.

8. The vehicle according to claim 1, wherein:
the lower panel is divided into at least a front part and a rear part in the front and rear direction; and
the front part and rear part of the lower panel are independently swingable with respect to the side panel.

9. The vehicle according to claim 1, further composing a drive motor, wherein the component includes a battery unit configured to supply electric power to the drive motor.

10. The vehicle according to claim 9, wherein:
the component further includes an energy absorbing member located outside the battery unit in a right and left direction of the battery unit; and
the lower panel is placed along a lower side of the energy absorbing member and removably fixed to the lower side of the energy absorbing member.

11. The vehicle according to claim 1, wherein:
the side panel and the lower panel are respectively made up of members independent of each other; and
the side panel and the lower panel are removably connected by using a fastener.

12. The vehicle according to claim 1, wherein:
the side panel and the lower panel are respectively made up of members independent of each other; and
the side panel and the lower panel are removably connected by a fitting structure.

13. The vehicle according to claim 12, wherein:
at least one of the lower panel and the side panel has at least one projecting portion;
the other one of the lower panel and the side panel has at least one recess; and
the fitting structure is made up of a combination of the projecting portion and the recess.

* * * * *